(No Model.)
R. K. ORTT & M. A. SHEARER.
NUT LOCK.
No. 509,239. Patented Nov. 21, 1893.
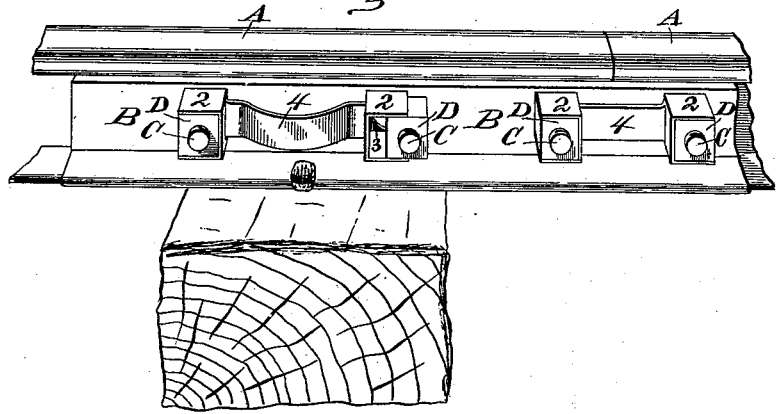
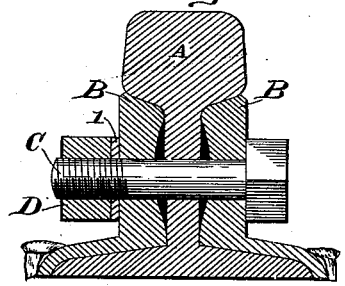
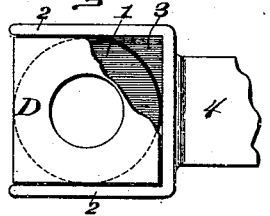 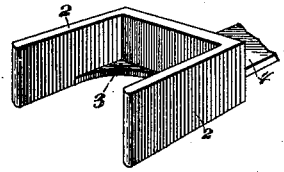
Witnesses:
Inventors
Rowley K. Ortt
Mahlon A. Shearer
by V. D. Stockbridge & Son
Attorneys

UNITED STATES PATENT OFFICE.

ROWLEY K. ORTT AND MAHLON A. SHEARER, OF NORRISTOWN, PENNSYLVANIA.

NUT-LOCK.

SPECIFICATION forming part of Letters Patent No. 509,239, dated November 21, 1893.

Application filed October 4, 1893. Serial No. 487,145. (No model.)

*To all whom it may concern:*

Be it known that we, ROWLEY K. ORTT and MAHLON A. SHEARER, citizens of the United States, residing at Norristown, in the county of Montgomery and State of Pennsylvania, have invented certain new and useful Improvements in Nut-Locks; and we do hereby declare that the following is a full, clear, and exact description of the invention, such as will enable others skilled in the art to which it appertains to make and use the same.

Our invention relates to improvements in nut-locks for securing nuts in place in connection with rail and other like joints.

The invention consists, in the combination with the nuts and bolts of a rail joint, of a washer between the nuts and fish-plate for holding the nuts away from said plate and double nut-locks consisting of two pairs of jaws, webs between the jaws to fit against the washer and catch behind the nuts, and a rigid bar connecting the two pairs of jaws.

In the drawings Figure 1, is a perspective showing our improved locking device as applied to use. Fig. 2, is a cross section showing one of the bolts in elevation. Fig. 3, is an enlarged elevation of the locking jaws in position the nut being broken away to show the washer. Fig. 4, is a perspective showing the web in one of the angles between the jaws.

The rails A, A, fish-plates B, B, and bolts C are of the usual or of any approved form and construction. The nuts D are the ordinary plane sided kind. In order to provide space for the webs of the locking device D, to be described, we use washers 1 about one quarter of an inch in thickness to raise the nuts away from the face of the fish-plates. These washers are of the usual disk form and of a diameter about equal to the length of the side of a nut.

The device for locking the nuts, comprises two pairs of jaws 2, 2, webs 3, 3, between each pair of jaws and a connecting bar 4 for coupling the two sets of jaws together. The connecting bar is first made bent or arched as shown at the left of Fig. 1. By means of this form of connecting bar the locking device may be adjusted between the nuts as shown at the left of Fig. 1 and then, by means of a blow, the arch is crushed and the jaws extended farther apart and the webs 3 driven under the corners of the nuts and against the washer; thus the device which locks the nuts is itself locked in its position.

The locking device is most conveniently made by casting, and the webs 3 are preferably about one quarter of an inch thick, that is to say, about the thickness of the washer.

Having described our invention, what we claim as new, and desire to secure by Letters Patent, is—

In a nut and bolt lock for rail joints, a locking device consisting of two pairs of jaws and a rigid connecting bar, in combination with the bolts and nuts and with a washer of less extent than the base of the nut and seated beneath the nuts to raise them and provide space for the webs of the locking device, substantially as described.

In testimony whereof we affix our signatures in presence of two witnesses.

ROWLEY K. ORTT.
MAHLON A. SHEARER.

Witnesses:
EUGENE D. EGBERT,
WARREN M. DICKINSON.